(12) United States Patent
Flammer

(10) Patent No.: US 7,437,040 B2
(45) Date of Patent: Oct. 14, 2008

(54) OPTICAL FIBER WITH REDUCED STIMULATION BRILLOUIN SCATTERING

(75) Inventor: Ivo Flammer, Paris (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/470,765

(22) Filed: Sep. 7, 2006

(65) Prior Publication Data

US 2007/0081779 A1    Apr. 12, 2007

(30) Foreign Application Priority Data

Sep. 9, 2005    (EP) .................................. 05291871

(51) Int. Cl.
G02B 6/02    (2006.01)
G02B 6/10    (2006.01)

(52) U.S. Cl. ........................ 385/123; 385/124; 385/127; 385/146

(58) Field of Classification Search ........................ None
See application file for complete search history.

(56) References Cited

U.S. PATENT DOCUMENTS

| 5,170,457 | A | 12/1992 | Jen |
| 5,303,318 | A * | 4/1994 | Tateda et al. ................. 385/123 |
| 6,542,683 | B1 | 4/2003 | Evans et al. |
| 7,228,039 | B2 * | 6/2007 | Bickham et al. ............ 385/123 |
| 2001/0038740 | A1* | 11/2001 | Hasegawa et al. ........... 385/123 |
| 2002/0118935 | A1 | 8/2002 | Balestra et al. |
| 2004/0021882 | A1 | 2/2004 | Kakutani |
| 2005/0013569 | A1 | 1/2005 | Dragic |
| 2007/0189699 | A1* | 8/2007 | Matsuo et al. ............... 385/142 |

FOREIGN PATENT DOCUMENTS

| EP | 0839770 A1 | 5/1998 |
| JP | 52-88349 | 7/1977 |
| JP | 9-48629 A | 2/1997 |
| JP | 09048629 A | 2/1997 |
| JP | 52088349 A | 7/1997 |
| JP | 9-218319 A | 8/1997 |
| JP | 09218319 A | 8/1997 |
| JP | 9-311231 A | 12/1997 |
| JP | 09311231 A | 12/1997 |
| WO | WO 99/04298 A1 | 1/1999 |

(Continued)

OTHER PUBLICATIONS

Botineau, J., et al., "Effective stimulated Brillouin gain in singlemode optical fibres", Electronics Letters, Nov. 9, 1995, vol. 31, No. 23.

(Continued)

Primary Examiner—Tina M Wong
(74) Attorney, Agent, or Firm—Sughrue Mion, PLLC

(57) ABSTRACT

An optical fiber having a given refractive index profile comprises a core region and a cladding region. The core region includes at least two co-dopants and the concentration of at least one of said core dopant varies continuously over the entire core region. The optical fiber has, at a wavelength of 1550 nm, a spontaneous Brillouin spectrum width equal or larger to 100 MHz.

Figure 1A:
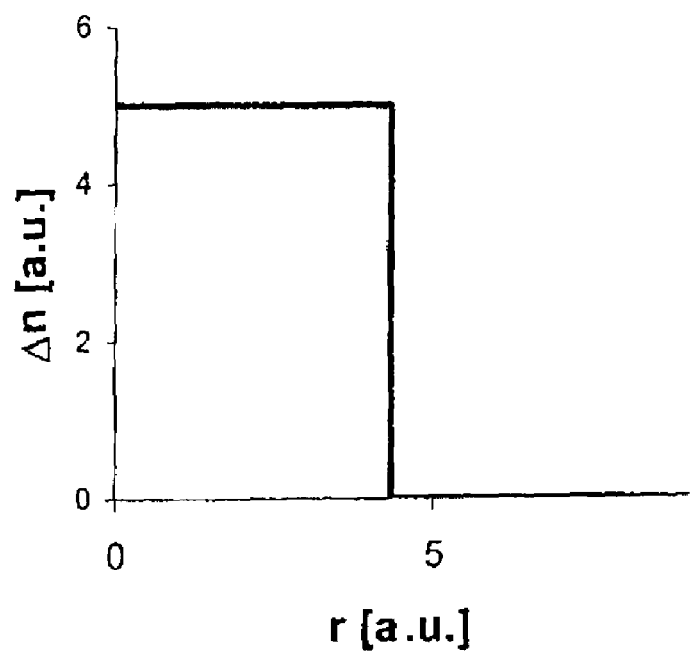

The optical fiber of the invention achieves a much higher Brillouin threshold compared to standard transmission fibers with limited fiber loss, less than 0.3 dB/km at a wavelength of 1550 nm, and without change in the optical transmission parameters of the fiber.

16 Claims, 3 Drawing Sheets

FOREIGN PATENT DOCUMENTS

| | | |
|---|---|---|
| WO | WO 02/14920 A1 | 2/2002 |
| WO | WO 2004/027941 A1 | 4/2004 |

OTHER PUBLICATIONS

Koyamada, Y., et al., "Simulating and Designing Brillouin Gain Spectrum in Single-Mode Fibers", Journal of Lightwave Technology, Feb. 2004, vol. 22, No. 2.

Yu, J., et al., "Analysis of Brillouin Frequency Shift and Longitudinal Acoustic Wave in a Silica Optical Fiber With a Triple-Layered Structure", Aug. 2003, vol. 21, No. 8.

Botineau J et al: "Effective stimulated Brillouin gain in singlemode optical fibres," Electronics Letters, vol. 31, No. 23, (Nov. 9, 1995), pp. 2032-2034.

Koyamada Y et al: "Simulating and designing Brillouin gain spectrum in single-mode fiberS," Journal of Lightwave Technology, vol. 22, No. 2, (Feb. 2004), pp. 631-639.

Jaewang Yu et al: "Analysis of Brillouin frequency shift and longitudinal acoustic wave in a silica optical fiber with a triple-layered structure," Journald of Lightwave Technology, vol. 21, No. 8, (Aug. 2003), pp. 1779-1786.

* cited by examiner

OPTICAL FIBER WITH REDUCED STIMULATION BRILLOUIN SCATTERING

The invention relates to the field of optical fiber transmission, and more specifically to an optical fiber having reduced loss due to stimulated Brillouin scattering (SBS).

For optical fibers, we generally qualify index profile as a function of the shape of the graph which links a radius of the fiber to the refractive index. In a standard manner abscises represent the distance r to the centre of the fiber and ordinates represent the difference between the refractive index of the core and the refractive index of the fiber cladding. We thus refer to the index profile as "step", "trapezoid" or "triangle" for graphs which have step, trapezoid or triangle respective shapes. These curves are generally representative of the theoretical shape or reference index profile of the fiber, the fiber manufacturing constraints can lead to a substantially different shape.

An optical fiber is typically composed of an optical core, having the function of transmitting and possibly amplifying an optical signal, and an optical cladding, having the function of confining the optical signal in the core. For this reason, the refractive indexes of the core $n_c$ and of the outside cladding $n_g$ are such that $n_c>n_g$. As commonly known, the propagation of an optical signal in a single-mode optical fiber is divided into a guided dominant mode in the core and into guided secondary modes over a certain distance throughout the core-cladding, called cladding modes.

Optical fibers are key components in modern telecommunication systems. One limitation for use of such fibers for long haul telecommunication applications is loss due to stimulated Brillouin scattering (SBS). SBS is an optical non-linearity due to interaction of optical photons with acoustic phonons of the glass matrix constituting the optical fiber. SBS limits the maximum optical power throughput of the optical fiber transmission system; as input power increases above what is known as the Brillouin threshold, the power that can be transmitted along the optical fiber reaches an upper limit. Any additional input power to the fiber scatters in the backward direction due to interaction with acoustic phonons rather than propagating in the forward, launch direction as a higher power signal. Thus SBS, as it is called, reduces the signal to noise ratio at the receiver and can cause the transmitter to become unstable due to the entry of reflected light. Moreover, the increasing use of optical amplifiers, solid state Nd:YAG lasers, and external modulation at ever increasing data rates over longer and longer distances all combine to exacerbate SBS.

Techniques suggested in the literature to increase the Brillouin threshold, minimize the detrimental effects of SBS, and increase the power handling capacity of the fiber rely, e.g., on broadening either the photon energy spectrum of the source or the phonon energy spectrum of the glass to reduce the efficiency of the interaction. A broadening of the spontaneous Brillouin spectrum width will increase the Brillouin threshold. This can be achieved by making the Brillouin frequency shift to vary in the fiber section or along the fiber length.

EP-A-0839 770 proposes modulating drawing tension along the fiber to suppress SBS with no significant change in fiber loss or dispersion factors.

JP-A-09-311231 proposes changing the refractive index profile along the length of the fiber (axial direction) by varying the background fluorine concentration. WO-A-2004/027941 proposes changing the refractive index profile along the length of the fiber by application of ultraviolet radiation or by thermal treatment.

U-A-2002/0118935 proposes an irregular coating surrounding the optical cladding that varies in a lengthwise direction in order to alter the mode profile of the acoustic waves.

"Stimulated Brillouin Scattering suppression by means of applying strain distribution to fiber with cabling", N. Yoshizawa et al., IEEE JLT, Vol 11, No 10, pp 1518-1522, 1993 proposes wrapping the fiber around a central rod to induce stress to change the energy distribution of acoustic phonons.

Some disadvantages of changing the index of refraction along the axial direction of the fiber, and tight fiber wrapping, include non-uniform fiber properties (splicing characteristics, Raman gain, cut-off wavelength) along the fiber length and increased fatigue which impacts fiber lifetime.

U.S. Pat. No. 6,542,683 proposes broadening the energy spectrum of participating SBS phonons by providing a fiber core comprising alternating layers of glass modifying dopant leading to nonuniform thermal expansion and viscosity profiles that impart a residual permanent nonuniform stress in the fiber section. At least two layers of differing coefficients of thermal expansion (CTE) and viscosities generate strain variation in the fiber section which in turn generates Brillouin frequency shift variation, and hence linewidth increase of the mode.

CTE and viscosity control in alternating layers is hard to achieve and manufacturing process to obtain a preform of doped and undoped layers within the core requires costly equipments. Moreover, whenever the core is doped, fiber losses increase, especially when dopant concentrations have sharp variations. Such sharp variations will induce silica network defects at its interfaces causing increased absorption loss of the fiber and degraded aging behaviour.

U.S. Pat. No. 6,587,623 proposes controlling the acoustic waves to be badly guided in the fiber core, such to reduce photon-phonon interaction and thus reduce SBS effect. However, such a fiber is difficult to achieve as the fiber profile must fulfill at the same time good light guiding and bad acoustic guiding. In the effort of optimising for SBS effect, drawbacks in optical transmission properties are expected.

"Effective stimulated Brillouin gain in single mode optical fibers", J. Botineau et al., Electronics Letters, Nov. 9, 1995, Vol. 31, No. 23, establishes that trapezoid index profile fiber allow to achieve a higher Brillouin threshold compared to step index profile. However, trapezoid profile shapes might not be best suited for a specific telecommunication application There is therefore a need for an optical fiber with increased Brillouin threshold without change of the fiber's transmission characteristics, i.e. without change of the fiber index profile. There is also a need for an optical fiber with increased Brillouin threshold and limited fiber loss increase.

Accordingly, the invention proposes an optical fiber comprising:
- a core region having a given refractive index profile and including at least two co-dopants;
- a cladding region having a given refractive index profile;
  - wherein the concentration of at least one of said core dopant varies continuously over the entire core region;
- the optical fiber having, at a wavelength of 1550 nm, a spontaneous Brillouin spectrum width equal or larger to 100 MHz.

According to various embodiments, the fiber of the invention includes one or more of the following features:
- the concentration of said at least two core dopants varies continuously over the entire core region;

the variation of at least one core dopant concentration corresponds to an index variation superior or equal to $1.10^{-3}$;

the cladding region includes said at least one of said core dopants;

the refractive index profile of the core is a step profile, a double step profile or an alpha profile;

the at least two core dopants are chosen in a group comprising Ge, F, P, Al, Cl, B, N and alkali metals;

one of said core dopant is Germanium (Ge), the concentration of which varies in a range of 1 wt % to 20 wt %;

one of said core dopant is Fluorine (F), the concentration of which varies in a range of 0.3 wt % to 8 wt %;

one of said core dopant is Phosphorus (P), the concentration of which varies in a range of 1 wt % to 10 wt %;

an effective surface superior or equal to 50 µm², at a wavelength of 1550 nm;

an attenuation inferior or equal to 0.3 dB/km, at a wavelength of 1550 nm.

The invention also relates to an optical transmission system comprising:

an optical transmitter emitting optical signals in a predetermined range of wavelength with an increased Brillouin threshold power compared with a standard uniformly Ge doped step fiber;

a transmission optical fiber according to the invention; and an optical receiver receiving the optical signal with an improved signal to noise ratio (SNR) compared with said standard fiber.

Figure 1B:
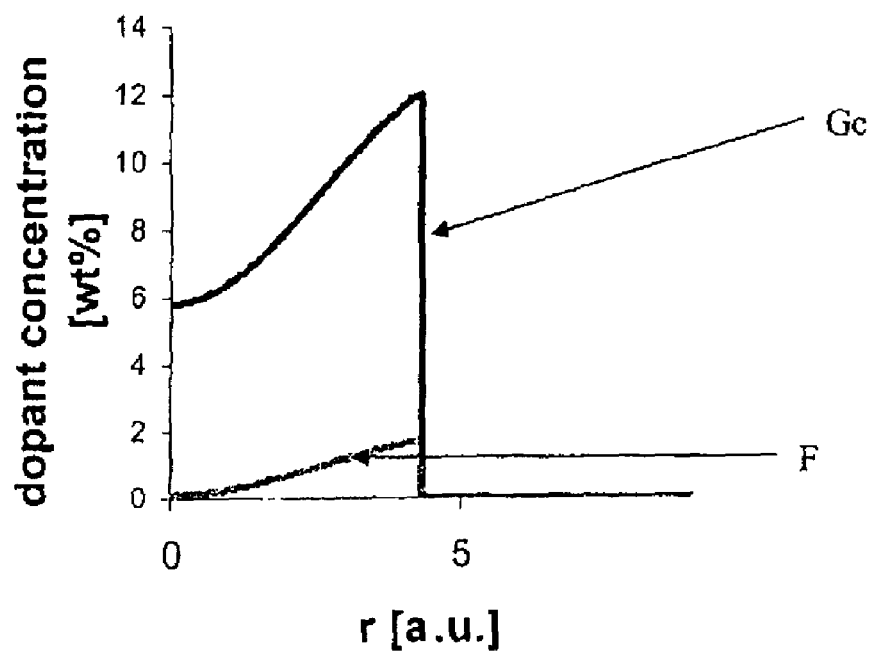
Figure 2A:
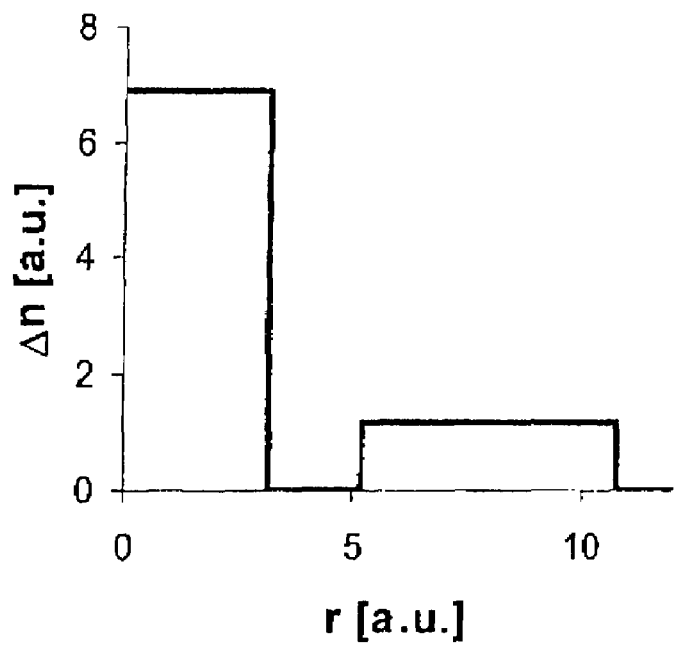
Figure 2B:
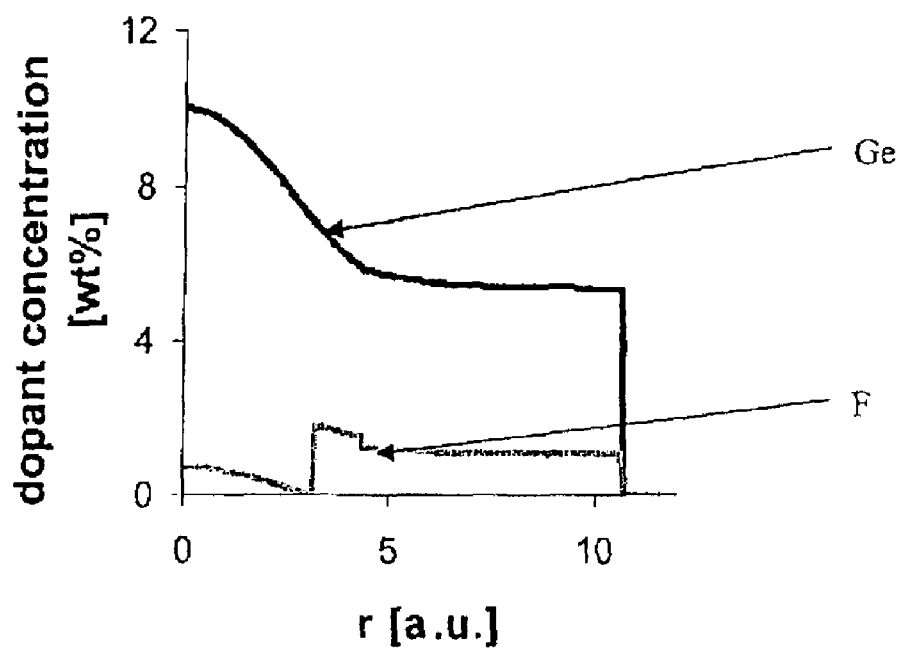
Figure 3A:
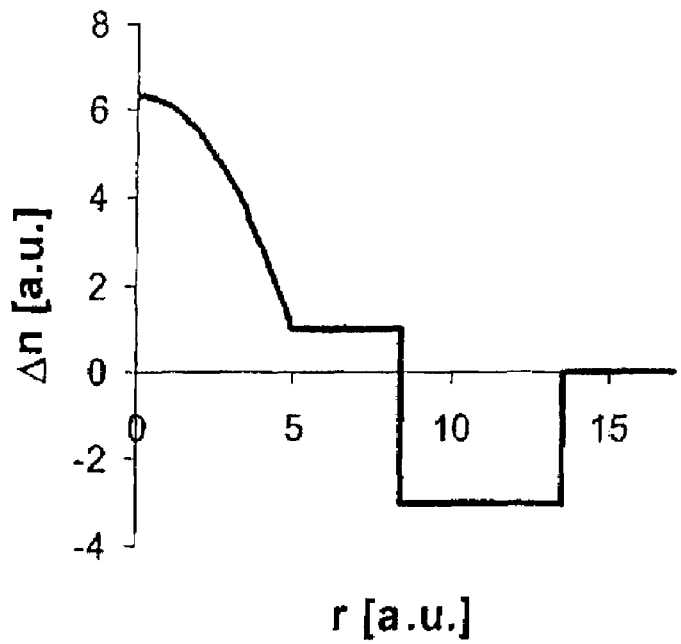
Figure 3B:
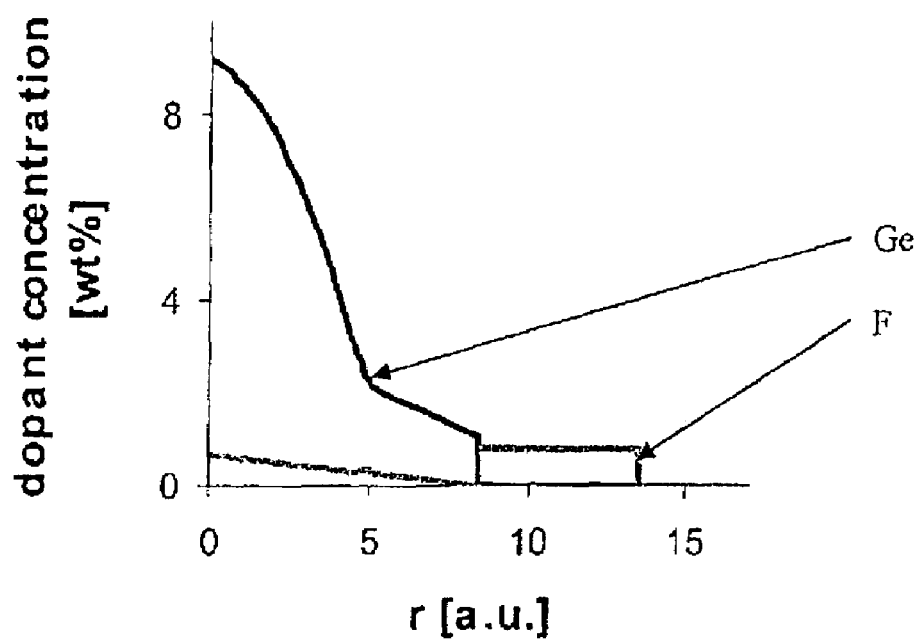

Other characteristics and advantages of the invention will become clearer upon reading the description that follows the embodiments of the invention, given by way of example and in reference to the annexed drawings, which illustrate:

FIG. 1a, a graphic representation of a reference index profile of an optical fiber according to a first embodiment of the invention;

FIG. 1b, a graphic representation of dopant concentrations in the optical fiber of FIG. 1a;

FIG. 2a, a graphic representation of a reference index profile of an optical fiber according to a second embodiment of the invention;

FIG. 2b, a graphic representation of dopant concentrations in the optical fiber of FIG. 2a;

FIG. 3a, a graphic representation of a reference index profile of an optical fiber according to a third embodiment of the invention;

FIG. 3b, a graphic representation of dopant concentrations in the optical fiber of FIG. 3a.

The optical fiber of the invention comprises a core region, where the optical signal to be transmitted is guided, and a cladding region for confining the optical signal in the core. The fiber has a given index profile defined according to various parameters depending on the application, i.e. mode field diameter, chromatic dispersion parameters, effective cut-off wavelength, effective area ...

According to the invention, the core region of the fiber includes at least two co-dopants and the concentration of at least one of said core dopant varies continuously over the entire core region.

Variation of dopant concentration in a radial direction of the fiber, in particular in the core of the fiber, allows broadening the Brillouin spectrum and therefore increases the Brillouin threshold. A smooth dopant variation ensures uniform mode power repartition for the different dopant concentrations and limits fiber losses. Use of co-dopants allows to keep a given index profile for the fiber and reduces the impact of SBS reduction on other optical parameters of the fiber, in particular mode field diameter and chromatic dispersion parameters. The dopant concentration along the length of the fiber, i.e. along its longitudinal axis, is constant. This means that the dopant concentration does not vary over the length of the fiber.

The optical fiber of the invention has, for a signal propagating at a wavelength of 1550 nm, a spontaneous Brillouin spectrum width equal or larger to 100 MHz. Such a broadened Brillouin spectrum allows increasing the Brillouin threshold by at least a factor 2 (or by 3 dB in logarithmic scale) compared to standard single mode fiber (SSMF). The optical fiber of the invention achieves a much higher Brillouin threshold compared to standard transmission fibers with limited fiber loss, less than 0.3 dB/km at a wavelength of 1550 nm, and without significant change in the optical transmission parameters of the fiber.

FIGS. 1a and 1b illustrate a first example of the optical fiber according to the invention.

The fiber of FIGS. 1a-b has a single step profile with the core having a given constant index value and the cladding having a smaller constant index value. FIG. 1a illustrates the index profile with arbitrary units. Such fiber profile is for instance used for standard single mode fibers (SSMF). Typically, SMF are based on silica and include dopant in the core to increase the refractive index value of silica, the concentration of which remains substantially constant to have a constant index value over the core region.

Turning to FIG. 1b, the core region of the fiber includes two dopants. A first dopant, Germanium (Ge) is known to increase the value of the refractive index of silica and a second dopant, Fluorine (F) is known to decrease the value of the refractive index of silica. FIG. 1b illustrates dopant concentrations in wt %. According to the invention, at least one of the core dopant varies continuously over the entire core region. In FIG. 1b, both co-dopants vary continuously over the entire core region. The use of at least two dopants guarantees that the index profile is maintained to a given referenced profile, i.e. a step profile in example of FIGS. 1a-b.

The variation of at least one core dopant concentration introduces density and elasticity variation in the fiber section that broadens the Brillouin spectrum and therefore increases the Brillouin threshold. The variation of core dopant concentration must be large enough to introduce sufficient density and elasticity variation in order to reduce SBS. It was established by Applicant that at least one of the core dopant should have a variation of concentration over the entire core region corresponding to an index variation superior or equal to $1.10^{-3}$; i.e. that would be the index variation imparted by the core dopant concentration variation if not compensated by another core dopant.

In order to have high threshold for stimulated Brillouin, the applicants would like to have a broad spontaneous Brillouin spectrum. As changing Germanium content leads to a shift in Brillouin wavelength, the applicants would like to have a) a large total spread of Germanium concentration and b) for a given spread of Germanium, to distribute the mode power as uniformely as possible over different Germanium concentration.

Concerning b), the optimum solution is given mathematically wherein the power fraction has to be proportional to the first derivative of the radial Germanium concentration.

$$D(Ge(r))/Dr = const * P(r)$$

The power fraction P(r) concerns the radial distribution of power in the fiber. P(r) is the modes fractional power in the ring going from r to r+dr. Ge(r) is the germanium concentration at radial position r.

Returning to FIG. 1b, Germanium concentration varies continuously from 5.8 wt % (percentage per weight) to 12 wt %; and Fluorine concentration varies continuously from 0.1 wt % to 1.7 wt %.

The smooth and regular variation of dopant concentration ensures uniform mode power repartition for the different dopant concentration and limits fiber losses. Simulations made on a fiber exemplified in FIGS. 1a-b gives, at a signal wavelength of 1550 nm, a spontaneous Brillouin spectrum width larger then 100 MHz and a SBS threshold power increased by at least a factor 2 compared to standard single mode fiber, and a limited Rayleigh loss increase of about 0.013 dB/km.

FIGS. 2a and 2b illustrate a second example of the optical fiber according to the invention. FIG. 2a illustrates the index profile with arbitrary units and FIG. 2b illustrates dopant concentrations in wt %.

The fiber of FIGS. 2a-b has a double step profile with the core having a central section with a given constant index value and a ring having a smaller constant index value, the cladding having a constant index value smaller then the central section index value and higher then the ring section index value. Such fiber profile is used for signal transmission. Turning to FIG. 2b, the core and the cladding regions of the fiber include two dopants; Germanium (Ge) and Fluorine (F) which both varies continuously over the entire core region and remains constant in the cladding region.

In FIG. 2b, Germanium concentration varies continuously from 9.6 wt % to 5.2 wt % over the core region; and Fluorine concentration varies continuously from 0.7 wt % to 0.0 wt % in the central core region and from 1.8 wt % to 1.2 wt % in the ring core region. The step in the Fluorine concentration corresponds to the index step between the central core region and the ring core region. Apart from this step, required by the referenced index profile determined for a given optical application, the Fluorine concentration has a smooth and constant variation over the core region; uniform mode power repartition for different dopant concentrations is ensured and fiber losses are limited. Simulations made on a fiber exemplified in FIG. 2 gives, at a signal wavelength of 1550 nm, a SBS spectrum width larger then 100 MHz and a SBS threshold power increased by a factor 2 compared with a standard uniformly Ge doped step fiber and a limited Rayleigh loss increase leading to a total loss smaller than 0.3 dB/km at 1550 nm.

FIGS. 3a and 3b illustrate a third example of the optical fiber according to the invention. FIG. 3a illustrates the index profile with arbitrary units and FIG. 3b illustrates dopant concentrations in wt %.

The fiber of FIGS. 3a-b has a alpha step profile with the core having a central alpha shaped section, a first ring with a given constant index value and a second buried ring, the cladding having a constant index value smaller than the first ring section index value and higher than the buried ring section index value. Such fiber profile is used for signal transmission.

Turning to FIG. 3b, the core and the cladding regions of the fiber includes two dopants; Germanium (Ge) and Fluorine (F). Germanium concentration varies continuously over the central core region and the first ring region and remains substantially nil in the buried ring region. Fluorine concentration varies continuously over the central core region and the first ring region and remains constant over the buried ring region.

In FIG. 3b, Germanium concentration varies continuously from 9.2 wt % to 1.0 wt % over the central core region and the first ring region; and Fluorine concentration varies from 0.7 wt % to 0 wt % over said regions. The step in the Fluorine concentration and the step in the Germanium concentration correspond to the index step between the first ring core region and the buried ring core region.

Simulations made on a fiber exemplified in FIG. 3 gives, at a signal wavelength of 1550 nm, a SBS spectrum width larger then 100 MHz and a SBS threshold power increased by at least a factor 2 compared to standard SMF fiber and a limited Rayleigh loss leading to total loss smaller than 0.3 dB/km at 1550 nm. Figures were given as examples to the invention. Other dopants then Germanium (Ge) and Fluorine (F) can be used to achieve the fiber with reduced SBS according to the invention. Core region includes at least two dopants that can be chosen in a group comprising Ge, F, P, Al, Cl, B, N and alkali metals.

Whenever one of said core dopant is Germanium (Ge), the concentration may vary in a range of 1 wt % to 20 wt %; whenever one of said core dopant is Fluorine (F), the may vary in a range of 0.3 wt % to 8 wt %; whenever one of said core dopant is Phosphorus (P), the concentration may vary in a range of 1 wt % to 10 wt %.

The optical fiber of the invention achieves a much higher Brillouin threshold compared to standard transmission fibers with limited fiber loss and without change in the optical parameters of the fiber determined by the index referenced profile. The fiber of the invention has, at a wavelength of 1550 nm, an effective surface superior or equal to 50 μm² and an attenuation inferior or equal to 0.3 dB/km at 1550 nm. Such fiber is suitable for use in data transmission in telecommunication systems. Such optical transmission system may comprise an optical transmitter emitting optical signals in a predetermined range of wavelength, a transmission optical fiber being the fiber of the invention and an optical receiver receiving the optical signal with improved signal to noise ratio (SNR) due to reduced SBS and limited fiber losses increase. The optical transmitter may input an optical signal with higher power into the fiber, compared to system of the prior art; the Brillouin threshold power for the transmission fiber being increased by at least a factor 2 compared with SMF.

The invention claimed is:

1. An optical fiber comprising:
a core region having a given refractive index profile and including at least two codopants;
a cladding region having a given refractive index profile;
wherein the concentration of at least one of said core dopant varies continuously in a radial direction over the entire core region;
the optical fiber having, at a wavelength of 1550 nm, a spontaneous Brillouin spectrum width equal to or larger than 100 MHz,
wherein the power fraction is proportional to the first derivative of the radial germanium concentration, $$\frac{d}{dr}(Ge(r)) = const * P(r)$$

wherein Ge(r)=germanium concentration in fiber at radial position r, and
P(r)=power in fiber at radial position r.

2. The fiber of claim 1, wherein the concentration of said at least two core dopants varies continuously in a radial direction over the entire core region.

3. The fiber of claim 1, wherein the variation of at least one core dopant concentration corresponds to an index variation superior or equal to $1.10^{-3}$.

4. The fiber of claim 1, wherein the cladding region includes said at least one of said core dopants.

5. The fiber of claim 1, wherein the refractive index profile of the core is a step profile.

6. The fiber of claim 1, wherein the refractive index profile of the core is a double step profile.

7. The fiber of claim 1, wherein the refractive index profile of the core is an alpha profile.

8. The fiber of claim 1, wherein the at least two core dopants are chosen in a group comprising Ge, F, P, Al, Cl, B, N and alkali metals.

9. The fiber of claim 1, wherein one of said core dopant is Germanium (Ge), the concentration of which varies in a range of 1 wt % to 20 wt %.

10. The fiber of claim 1, wherein one of said core dopant is Fluorine (F), the concentration of which varies in a range of 0.3 wt % to 8 wt %.

11. The fiber of claim 1, wherein one of said core dopant is Phosphorus (P), the concentration of which varies in a range of 1 wt % to 10 wt %.

12. The fiber of claim 1, having at a wavelength of 1550 nm an effective surface superior or equal to 50 $\mu m^2$.

13. The fiber of claim 1, having at a wavelength of 1550 nm an attenuation inferior or equal to 0.3 dB/km.

14. The fiber of claim 1, wherein the concentration of at least one of said core dopants is constant along the longitudinal axis of the fiber.

15. An optical transmission system comprising:
  an optical transmitter emitting optical signals in a predetermined range of wavelength with an increased Brillouin threshold power compared with a standard uniformly Ge doped step fiber;
  a transmission optical fiber according to claim 1;
  an optical receiver receiving the optical signal with an improved signal to noise ratio (SNR) compared with said standard fiber.

16. The fiber of claim 2, wherein the variation of at least one core dopant concentration corresponds to an index variation superior or equal to $1.10^{-3}$.

* * * * *